United States Patent
Alberg et al.

(10) Patent No.: US 10,846,273 B2
(45) Date of Patent: Nov. 24, 2020

(54) SYSTEM AND METHOD FOR AUTOMATIC INFERENCE OF A CUBE SCHEMA FROM A TABULAR DATA FOR USE IN A MULTIDIMENSIONAL DATABASE ENVIRONMENT

(71) Applicant: ORACLE INTERNATIONAL CORPORATION, Redwood Shores, CA (US)

(72) Inventors: Dima Alberg, Be'er Sheva (IL); Victor Belyaev, San Jose, CA (US); Guy Shaked, Be'er Sheva (IL); Gabby Rubin, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 940 days.

(21) Appl. No.: 15/332,769

(22) Filed: Oct. 24, 2016

(65) Prior Publication Data
US 2017/0116228 A1  Apr. 27, 2017

Related U.S. Application Data

(60) Provisional application No. 62/245,885, filed on Oct. 23, 2015.

(51) Int. Cl.
*G06F 16/00* (2019.01)
*G06F 16/21* (2019.01)
(Continued)

(52) U.S. Cl.
CPC .......... *G06F 16/212* (2019.01); *G06F 16/211* (2019.01); *G06F 16/258* (2019.01);
(Continued)

(58) Field of Classification Search
CPC .... G06F 16/211; G06F 16/212; G06F 16/258; G06F 16/283; G06F 16/83; G06F 16/9024
(Continued)

(56) References Cited

U.S. PATENT DOCUMENTS 6,775,675 B1 * 8/2004 Nwabueze ............. G06Q 10/10
707/600
9,483,537 B1 * 11/2016 Peters ................... G06F 16/284
(Continued)

FOREIGN PATENT DOCUMENTS

WO  2006059243 A2  6/2006

OTHER PUBLICATIONS

European Patent Office, International Searching Authority, International Search Report and Written Opinion for International Application No. PCT/US2016/058209 dated Feb. 15, 2016, 15 Pages.
(Continued)

*Primary Examiner* — Michelle N Owyang
(74) *Attorney, Agent, or Firm* — Tucker Ellis LLP

(57) ABSTRACT

In accordance with an embodiment, described herein is a system and method for automatic inference of a cube schema from a tabular data for use in a multidimensional database environment. A cube schema inference component can successively perform column-wise splits to calculate information gain ratios between each pair of a plurality of columns in the tabular data. A cross correlation matrix can be constructed from the information gain ratios between each pair of columns. The system can determine relationships among the plurality of columns based on the cross correlation matrix; create a hierarchy directed graph to represent the relationships; and further transform the hierarchy directed graph into a cube schema that can be used to create a cube for loading the tabular data, or to map the
(Continued)

tabular data into an existing cube in the multidimensional database environment.

20 Claims, 8 Drawing Sheets

(51) Int. Cl.
  *G06F 16/83* (2019.01)
  *G06F 16/25* (2019.01)
  *G06F 16/28* (2019.01)
  *G06F 16/901* (2019.01)
(52) U.S. Cl.
  CPC ............ *G06F 16/283* (2019.01); *G06F 16/83* (2019.01); *G06F 16/9024* (2019.01)
(58) Field of Classification Search
  USPC .................................................. 707/600–899
  See application file for complete search history.

(56) References Cited

U.S. PATENT DOCUMENTS

| | | | |
|---|---|---|---|
| 9,760,571 B1* | 9/2017 | Ben-Natan | G06F 16/93 |
| 10,360,527 B2* | 7/2019 | Abe | G06Q 10/067 |
| 2003/0145004 A1 | 7/2003 | Egilsson et al. | |
| 2007/0027674 A1* | 2/2007 | Parson | G06F 17/271 |
| | | | 704/9 |
| 2009/0043730 A1 | 2/2009 | Lavdas et al. | |
| 2009/0228430 A1* | 9/2009 | Berger | G06F 16/283 |
| 2012/0005153 A1* | 1/2012 | Ledwich | G06Q 10/10 |
| | | | 707/602 |
| 2012/0109934 A1* | 5/2012 | Weyerhaeuser | G06F 16/24547 |
| | | | 707/713 |
| 2013/0332221 A1 | 12/2013 | Fay et al. | |
| 2015/0074071 A1* | 3/2015 | Bogrett | G06F 16/93 |
| | | | 707/703 |
| 2015/0339369 A1* | 11/2015 | Rais-Ghasem | G06F 16/367 |
| | | | 707/739 |
| 2016/0378843 A1* | 12/2016 | Cherwonka | G06F 16/254 |
| | | | 707/602 |
| 2017/0116227 A1* | 4/2017 | Shaked | G06F 16/283 |

OTHER PUBLICATIONS

Usman, Muhammad et al., "Discovering diverse association rules from multidimensional schema", Expert Systems with Applications, © 2013 Elsevier Ltd., pp. 5975-5996.

Nebot, Victoria et al., "Multidimensional Integrated Ontologies: A Framework for Designing Semantic Data Warehouses", Stefano Spaccapietra et al., Journal on Data Semantics XIII, LNCS 5530, 2009, pp. 1-36.

United States Patent and Trademark Office, Office Action dated Jan. 30, 2019 for U.S. Appl. No. 15/332,781, 12 Pages.

Oracle®, Oracle® Essbase Release 11.1.1, Database Administrator's Guide, Oracle® Enterprise Performance Management System, Copyright © 1996, 2008, 1182 pages.

Oracle©, Oracle Business Intelligence Foundation Suite, Technical Overview, Jan. 2011, © Oracle 2011, 56 pages.

United States Patent and Trademark Office, Office Action dated Aug. 1, 2019 for U.S. Appl. No. 15/332,781, 12 Pages.

United States Patent Office, Office Action dated Jul. 18, 2018 for U.S. Appl. No. 15/332,781, 15 Pages.

* cited by examiner

SYSTEM AND METHOD FOR AUTOMATIC INFERENCE OF A CUBE SCHEMA FROM A TABULAR DATA FOR USE IN A MULTIDIMENSIONAL DATABASE ENVIRONMENT

CLAIM OF PRIORITY

This application claims the benefit of priority to U.S. Provisional Application titled "SYSTEM AND METHOD FOR AUTOMATIC INFERENCE OF CUBES FROM TABULAR DATA FOR USE IN A MULTIDIMENSIONAL DATABASE", Application No. 62/245,885, filed Oct. 23, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for automatic inference of a cube schema from a tabular data for use in a multidimensional database environment.

BACKGROUND

A multidimensional database, for example, Oracle Essbase, is designed for efficient and convenient storage and retrieval of large volumes of data that can be viewed and analyzed from multiple perspectives. Such a multidimensional database can include cubes that logically represent multidimensional data. Cubes can be built from a tabular data stored in a flat file or a database table. Building cubes from a tabular data requires a user or a system to identify relationships and dependencies among columns in the tabular data, so as to extract schemas for the cubes. However, for a tabular data that includes hundreds of columns, identifying a schema for use in building a cube can be a daunting task.

SUMMARY

In accordance with an embodiment, described herein is a system and method for automatic inference of a cube schema from a tabular data for use in a multidimensional database environment. The system can include a cube schema inference component that can successively perform column-wise splits to calculate information gain ratios between each pair of a plurality of columns in the tabular data. A cross correlation matrix can be constructed from the information gain ratios between each pair of columns. The system can determine relationships among the plurality of columns based on the cross correlation matrix, and create a hierarchy directed graph to represent the relationships. The system can further transform the hierarchy directed graph into a cube schema that can be used to create a cube for loading the tabular data, or to map the tabular data into an existing cube in the multidimensional database environment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
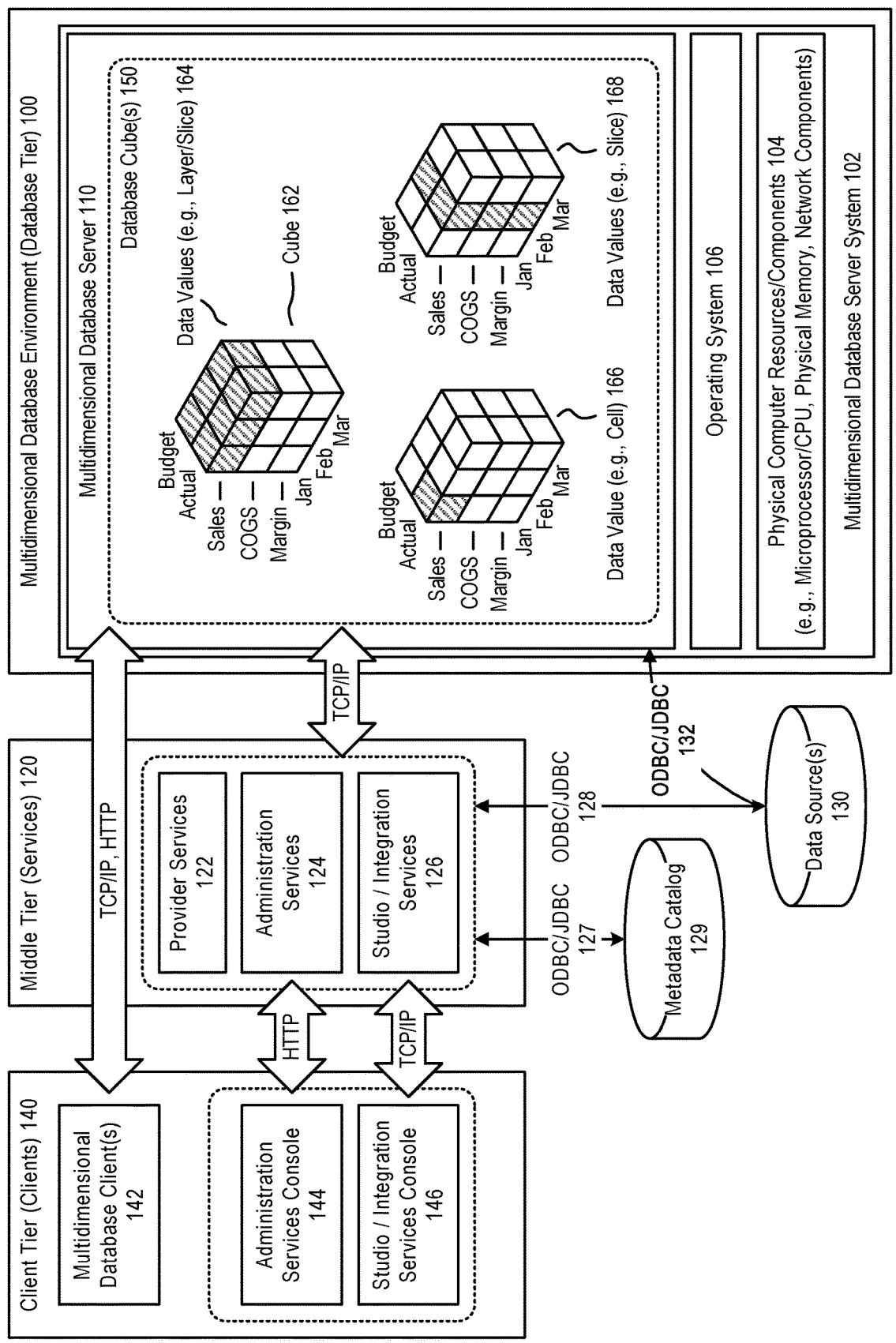
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142

(e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, online analytical processing (OLAP) provides an environment that enables users to analyze enterprise data. For example, finance departments can use OLAP for applications such as budgeting, activity-based costing, financial performance analysis, and financial modeling, to provide "just-in-time" information.

Automatic Inference of Cubes

In a tabular data file (tabular data), columns are typically heterogeneously correlated, with many hidden dependencies between the columns (attributes). Manually extracting a cube schema from the tabular data takes time and effort.

In accordance with an embodiment, the system and method described herein can be used for automatic inference of a cube schema from a tabular data for use in a multidimensional database environment. The system can include a cube schema inference component that can successively perform column-wise splits on the tabular data to calculate information gain ratios between each pair of a plurality of columns in the tabular data. A cross correlation matrix can be constructed from the information gain ratios between each pair of columns. The system can determine relationships among the plurality of columns based on the cross correlation matrix, and create a hierarchy directed graph to represent the relationships. The system can further transform the hierarchy directed graph into a cube schema, and use the cube schema to create a cube in the multidimensional database environment for loading the tabular data.

In accordance with an embodiment, the system can compare the hierarchy directed graph inferred from the tabular data with a hierarchy directed graph from an existing cube, and determine whether the two hierarchy directed graphs match each other. If they match, the tabular data can be loaded into the existing cube; otherwise, a new cube can be created to store the tabular data.

In accordance with an embodiment, the tabular data can include data from different data domains, for example, medical and financial data domains. Since the system calculates statistical correlations in terms of entropies and/or information gain ratios between columns, and without interpreting the values of the data, the system can detect hidden relations between columns in the tabular data, even when the columns use different encodings.

In accordance with an embodiment, when calculating statistical correlations among the columns, the system can examine the string pattern in a cell or a string pattern converted from a value in a cell, and does not need to analyze or interpret the meaning associated with each string pattern.

Introduction

In accordance with an embodiment, the following terms are used throughout the document.

Entropy: In accordance with an embodiment, an entropy H(X) of X can be defined as $$H(X) = -\sum_{x \in X} p(x) \log p(x)$$

wherein X is a column/attribute in a tabular data, for example, a database table or an Excel sheet. An entropy can be considered a function of probability distributions, and can be independent of actual values of the attribute.

Conditional Entropy: In accordance with an embodiment, a conditional entropy of X and Y can be defined as $$H(X \mid Y) = -\sum_{x \in X} \sum_{y \in Y} p(x, y) \log p(x \mid y)$$

where X and Y are columns or attributes in a tabular data, for example, a database table or an Excel sheet. A conditional entropy H(X|Y) can measure the uncertainty of attribute X, given knowledge of attribute Y. It is a non-negative real number and becomes zero when X=Y or when there exists a functional dependency from Y to X, because in these cases, no uncertainty exists for attribute X. On the other hand, if the two attributes X and Y are independent, the conditional entropy H(X|Y) equals H(X).

Information Gain: In accordance with an embodiment, an information gain of X and Y can be defined using the entropy and the conditional entropy as $$MI(X;Y)=H(Y)-H(Y|X)$$

where X and Y are columns/attributes in a tabular data, for example, a database table or an Excel sheet. An information gain is a function of probability distributions and is independent of actual values of the attributes.

Information Gain Ratio: In accordance with an embodiment, an Information Gain Ratio of X can be defined as $$IGR(X) = \frac{H(Y) - H(Y \mid X)}{H(X)}$$

where X and Y are columns/attributes in a tabular data, for example, a database table or an Excel sheet. The information gain ratio measures the reduction in uncertainty of one attribute due to the knowledge of the other attribute. It measures the amount of information that one attribute contains about the other. It is zero when two attributes are independent, and increases as the dependency between the two attributes grows. The information gain ratio of an attribute with itself equals 1.

Figure 2:
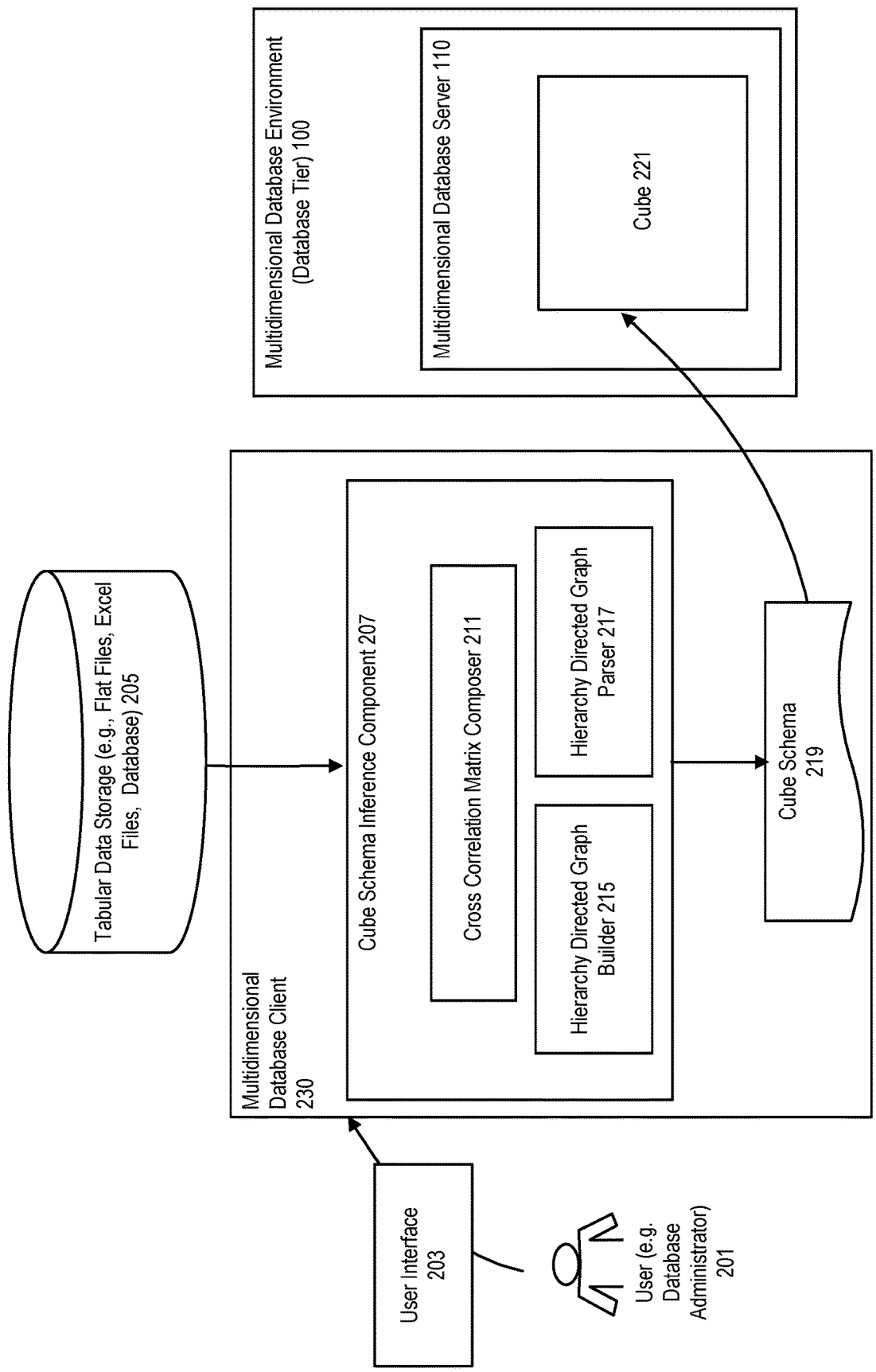
FIG. 2 illustrates a system for automatic inference of a cube schema from a tabular data for use in a multidimensional database environment, in accordance with an embodiment.

FIG. 2 illustrates a system for automatic inference of a cube schema from a tabular data for use in a multidimensional database environment, in accordance with an embodiment.

As shown in FIG. 2, a cube schema inference component 207 can include a cross correlation matrix composer 211, a hierarchy directed graph builder 215, and a hierarchy directed graph parser 217; and can be executed to infer a cube schema 219 from a tabular data received from a tabular data storage 205. The tabular data can consist of or can be presented in columns or tables. For example, the tabular data can be data stored in an Excel sheet, a plain text file, or a relational database table.

In accordance with an embodiment, the cube schema inference component can retrieve the tabular data through a user interface 203 in response to a request from a user 201, and provide the tabular data as an input to the cube schema inference component.

In accordance with an embodiment, the cube schema inference component can be part of a multidimensional database client 230, or execute as a self-contained stand-alone application.

In accordance with an embodiment, the cross correlation matrix composer can perform column-wise splits successively on the tabular data to calculate information gain ratios between each pair of a plurality of columns in the tabular data, and construct a cross correlation matrix representing the information gain ratios between each pair of columns.

In accordance with an embodiment, by performing successive column-wise splits, the system can calculate two information gain ratios for each pair of columns. For example, two information gain ratios can be calculated for the column pair Column A and Column B to measure the amount of information that one attribute contains about the other.

In accordance with an embodiment, as described above, the information gain ratios can be calculated using the following formula:

$$IGR(X) = \frac{H(Y) - H(Y \mid X)}{H(X)}$$

In accordance with an embodiment, the cross correlation matrix can be a data structure (e.g., a two-dimension array) that stores attributes of the relationships (e.g., information gain ratios) between pairs of columns.

In accordance with an embodiment, the hierarchy directed graph builder can examine the cross correlation matrix to determine relationships between each pair of columns, and build a hierarchy directed graph from the cross correlation matrix to represent the relationships. The hierarchy directed graph can be constructed to include pair-wise information gain ratios over all pairs of columns/attributes in the tabular data.

In accordance with an embodiment, the hierarchy directed graph can also be a data structure that comprise a finite set of vertices (nodes) and a finite set of ordered pairs of edges. The hierarchy directed graph can be parsed by the hierarchy directed graph parser, which can transform the graph into an XML-based cube schema 219, for example, an Essbase database outline, which can be used to create a cube 221 on the database server.

Figure 3:
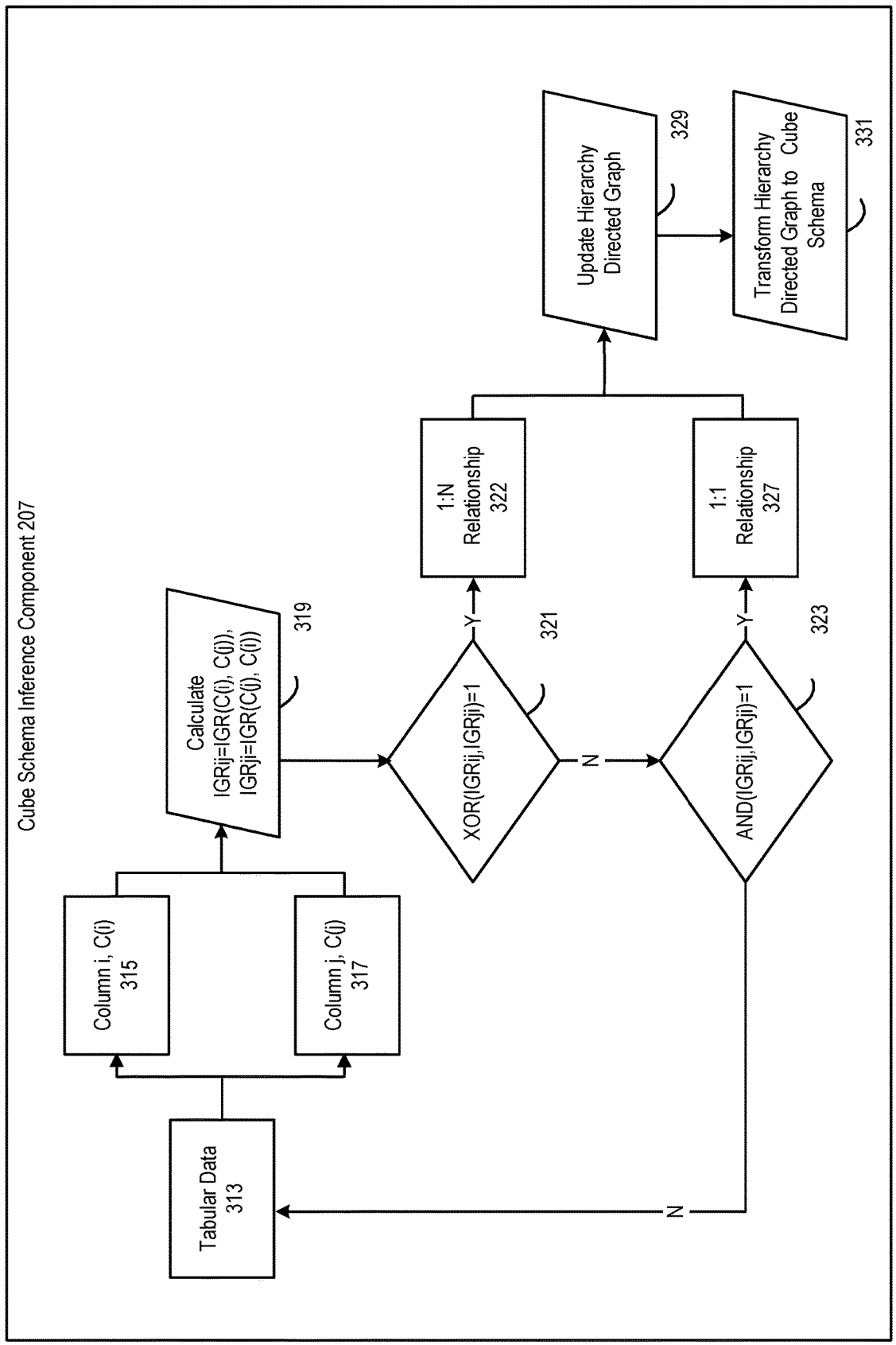
FIG. 3 illustrates automatic inference of a cube schema from a tabular data for use in a multidimensional database environment, in accordance with an embodiment.

FIG. 3 illustrates automatic inference of a cube schema from a tabular data for use in a multidimensional database environment, in accordance with an embodiment.

As shown in FIG. 3, a tabular data 313 including a plurality of columns can be split at each column by the system to calculate information gain ratios between each pair of columns.

At step 319, information gain ratios (i.e. IGRij and IGRji) between Column i 315 and Column j 317 can be calculated. A relationship between the pair of columns can be determined using the information gain ratios.

At step 321, an XOR operator can be used to determine the relationship between the pair of columns. The value of the XOR operator is true if one and only one of the information gain ratios between the pair of columns is 1.

At step 322, if the value of the XOR operator is true, the system can determine that there is a one-to-many relationship between the pair of columns.

At step 323, if the value of XOR operation is false, an AND operator can be used to continue to examine the relationship between the pair of columns. For the AND operator to be true, both information gain ratios need to be true.

At step 327, if the value of the AND operator is true, the system can determine there is a one-to-one relationship between the pair of columns; otherwise, there is no correlation or dependency between the pair of columns, and the system can proceed to examine the relationship between a different pair of columns.

At step 329, the relationship determined between each pair of columns can be used to update a hierarchy directed graph.

In accordance with an embodiment, an XML file can be created as a template for the hierarchy directed graph, which can be updated with the relationship between each pair of columns.

At step 331, the hierarchy directed graph can be transformed into a cube schema.

Figure 4:
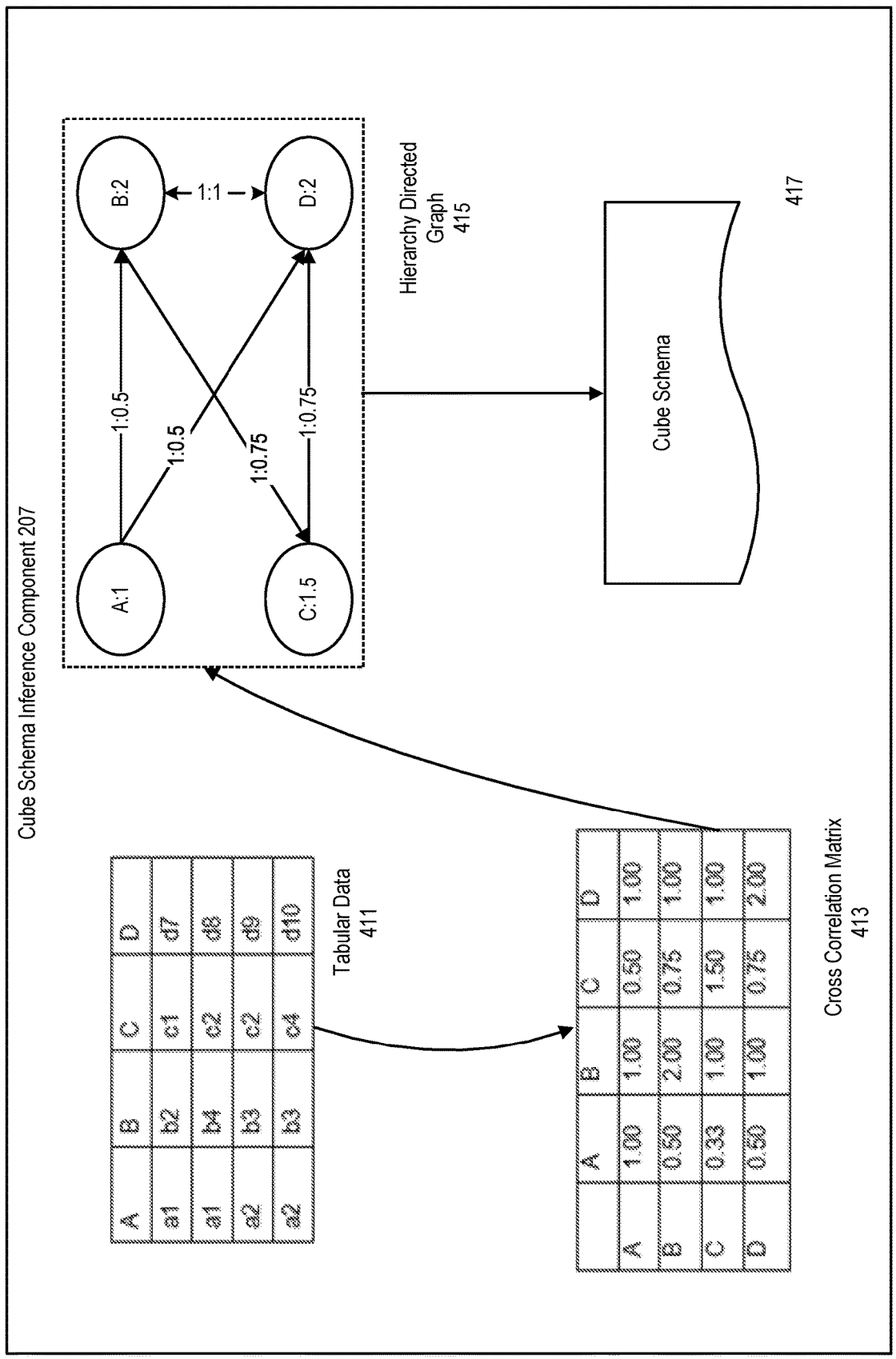
FIG. 4 illustrates an example of using the system to automatically infer a cube schema from a tabular data, in accordance with an embodiment.

FIG. 4 illustrates an example of using the system to automatically infer a cube schema from a tabular data, in accordance with an embodiment.

As shown in the figure, a tabular data 411 includes four columns of data, which can represent a cube with dimensions A and C and a numeric attribute D.

In the tabular data, a1 in Column A corresponds to b2 and b3 in Column b, a2 in Column A corresponds to b1 and b3 in Column B, c2 in Column C corresponds to d8 and d9 in Column D, and c1 and c4 in Column C corresponds to d7 and d10 respectively in Column D.

In accordance with an embodiment, a cross correlation matrix of information gain ratios 413 can be constructed using information gain ratios calculated by successively splitting at each column.

For example, when splitting at Column A, the calculated information gain ratios can include an information gain ratio (1:00) for Column A and Column B, an information gain ratio (0.5) for Column A and Column C, an information gain ratio (1:00) for Column A and Column D.

Similarly, when splitting at Column B, the calculated information gain ratios can include an information gain ratio (0.50) for Column B and Column A, an information gain ratio (0.75) for Column B and Column C, an information gain ratio (1:00) for Column B and Column D.

As described above, an information gain ratio can measure the amount of information that one attribute contains about the other. In this particular example, Column A contains more information about Column B than Column B contains about Column A.

From the perspective of Column A, when the value of a cell in Column A is a1, the corresponding values in Column B is b2 and b4; when the value of a cell in Column A is not a1, no value in a corresponding cell in Column B is b2 or b4.

From the perspective of Column B, when a cell in Column B is b2, the corresponding cell value in Column A is a1. However, when a cell in Column B is not b2, one of the corresponding cell value in Column A remains a1.

As such, the information gain ratio for Column A and Column B is 1, whereas the information gain ratio for Column B and Column A is 0.5.

In accordance with an embodiment, the cross correlation matrix of information gain ratios 413 can additionally include cross correlations between the same attributes. The main diagonal of the matrix can contain a value equivalent to the mutual information with each column itself. The value can be calculated using the entropy formula described above.

As further shown in FIG. 4, a hierarchy directed graph 415 can be constructed from the cross correlation matrix. The directed graph includes a plurality of nodes and an edge between each pair of nodes except between node A and node C. Each node represents an attribute or column in the tabular data 411, and each edge represents the relationship between a pair of nodes. The label on each edge indicates information gain ratios between the two adjacent nodes.

For example, the information gain ratio between nodes A and B is 1.0, and the information gain ratio between B and A is 0.50. The label on a node represents the entropy of the attribute or column, which is equivalent to its mutual information with itself or self-information.

In this particular example, since there is no correlation or dependency between Column A and Column C, there is no edge shown between the two nodes.

In accordance with an embodiment, a cube schema 417 can be generated from the hierarchy directed graph. The cube schema can be an XML file specifying a database outline that can be used to create a cube in a multidimensional database server for use in loading the tabular data, or can be used to determine whether the tabular data can be loaded into an existing cube based on a comparison between the generated outline and an existing outline in the database server.

Identifying Cube Elements

In accordance with an embodiment, when transforming the hierarchy directed graph into a cube schema or database outline, the system needs to be able to map each column on the directed hierarchy graph to a particular element (e.g., a measure column, a top-level column, a base-level column, or an attribute column) of a cube defined by the cube schema.

In accordance with an embodiment, a heuristic process can be used to identify cube elements from a plurality of columns on the directed hierarchy graph, for use in constructing a cube schema/star schema.

Under the heuristic process, one or more cube elements, for example, one or more measure columns and/or one or more flat dimension columns (flat hierarchy dimension columns), that can be identified with high probability, can be identified first and removed from the plurality of columns.

From the remaining columns, more complex cube elements (e.g., columns in a dimension hierarchy) can be identified.

In accordance with an embodiment, a column can be identified as a measure column if the column is a numeric or floating point column, and does not have a relationship (i.e. one-to-one, many-to-one, or one-to-many relationship) with any other column in the plurality of columns.

In accordance with an embodiment, the system can support construction of a star schema for a measureless cube. For example, when an Excel sheet does not include a measure column, the system can add a virtual column as a measure column that can hold an arbitrary number, for example, the number "1", in each row of the virtual column and use this column as the measure column. In this case, the actual columns in the Excel sheet can be dimension hierarchies and the virtual column can be the measure column.

In accordance with an embodiment, a column can be identified as a flat hierarchy dimension column if the column is a text column that does not have a relationship with any other column in the plurality of columns, or the column is a numeric or text column that has a one-to-many or many-to-one relationship with all other columns. A numeric column with no duplicate values can be identified as a flat hierarchy dimension column by default.

In accordance with an embodiment, the remaining columns can include a plurality of dimensions and one or more measure columns. Each dimension can comprise a set of columns of the remaining columns.

In accordance with an embodiment, to create a dimension hierarchy for a dimension, the system can identify a base-level column and one or more top-level columns from the set of columns associated with the dimension.

In accordance with an embodiment, a base-level column can be a column that has only a many-to-one or one-to-one relationship with each other column in a set of columns constituting a dimension. A top-level column can be a column that has a one-to-many relationship or one-to-one relationship with each other column in the set of columns for a dimension. In the set of columns for the dimension, an intermediate column is a column that has a one-to-many with the base-level column, and a many-to-one relationship with the top-level column.

In accordance with an embodiment, a dimension hierarchy can be created using the base-level column, the top-level column, and one or more intermediate columns; and can be added to the one or more flat hierarchy dimension columns. The one or more measure columns, the one or more flat hierarchy dimension columns, and the dimension hierarchy can be used to create a cube schema.

In accordance with an embodiment, when multiple top-level columns are identified for a set of columns in a dimension, a top-level level that can be combined with one or more intermediate level columns and the base-level column to create the highest/longest combination/chain can be selected as the top-level column. The rest of the top-level columns can be identified as attributes, or top-level columns for alternate dimension hierarchies.

In accordance with an embodiment, the highest hierarchy built using the base-level column, the selected top-level column, and the intermediate level columns can be considered the main dimension hierarchy. Columns in the set of columns for the dimension that are not included in the main dimension hierarchy can be identified as attributes of the base-level column.

In accordance with an embodiment, an alternative dimension hierarchy can be identified by repeating the process described above after removing the top-level column and the intermediate level columns. Each alternative dimension hierarchy and the main dimension hierarchy (identified the first time) for a particular dimension can share the same base-level column.

Figure 5A:
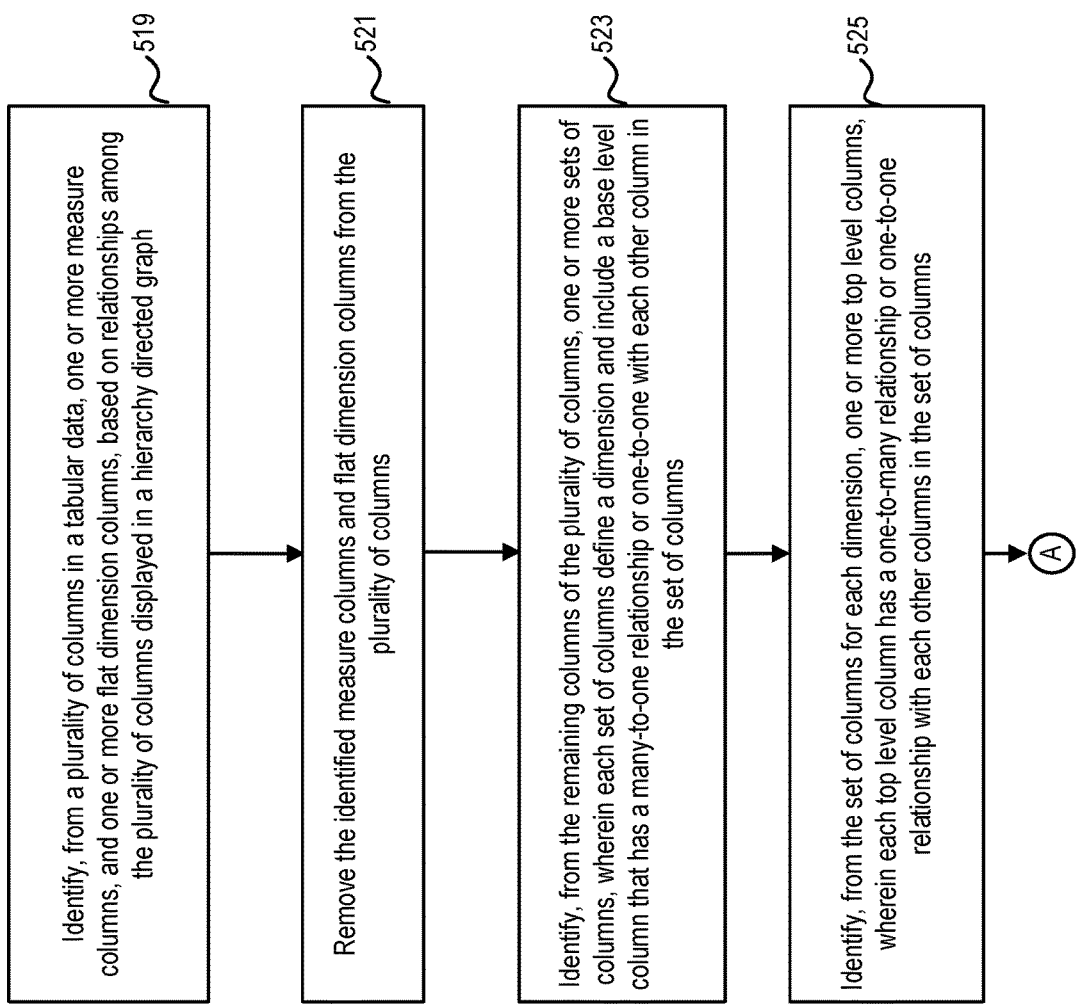
FIGS. 5A-5B illustrate a flow chart for mapping columns of a tabular data to a plurality of cube elements, in accordance with an embodiment.
Figure 5B:
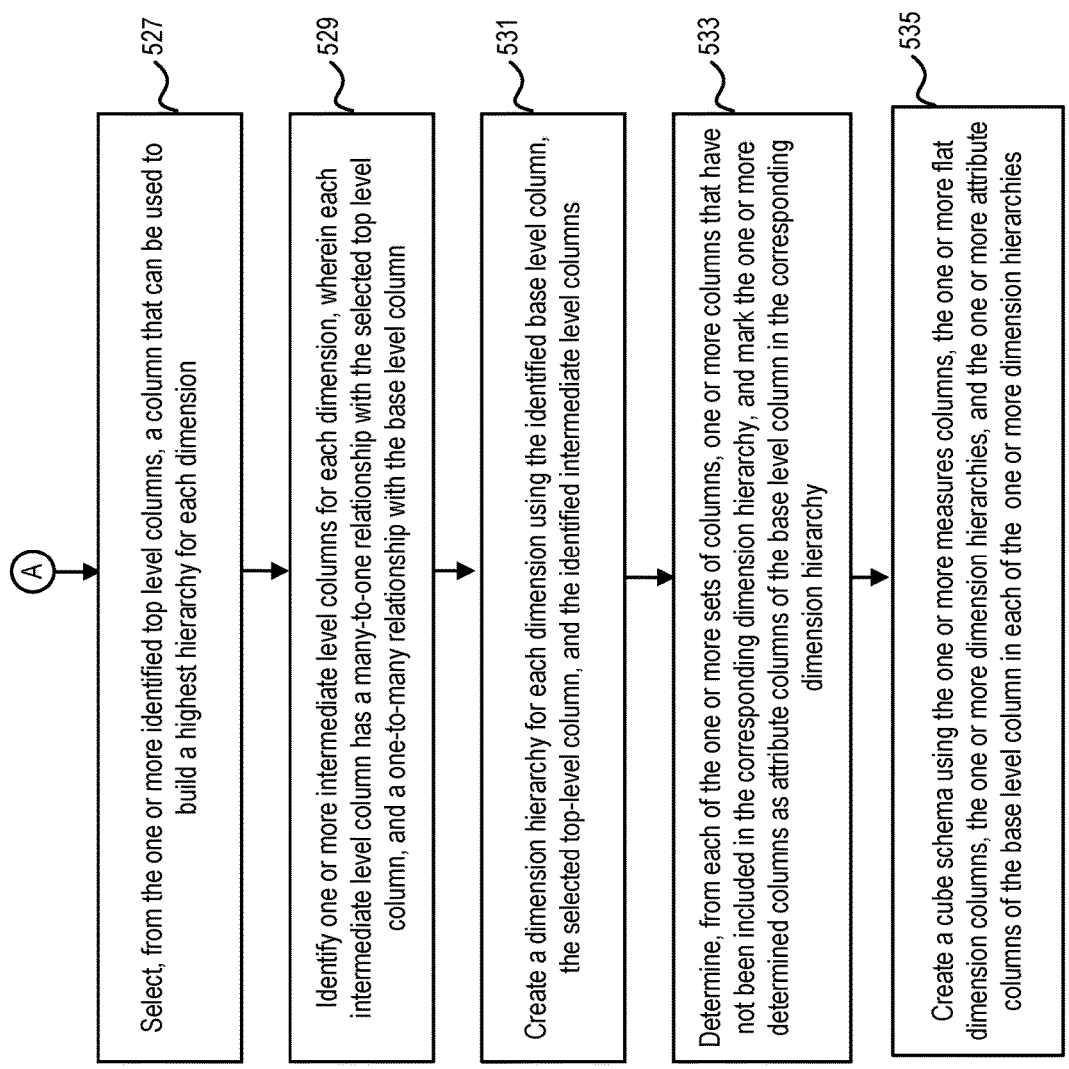

FIGS. 5A-5B illustrate a flow chart for mapping columns of a tabular data to a plurality of cube elements, in accordance with an embodiment.

As shown in FIGS. 5A-5B, at step 519, the cube schema inference component can identify, from a plurality of columns in a tabular data, one or more measure columns, and one or more flat dimension columns, based on relationships among the plurality of columns displayed in a hierarchy directed graph.

At step 521, the identified measure columns and flat dimension columns can be removed from the plurality of columns.

At step 523, the cube schema inference component can identify, from the remaining columns of the plurality of columns, one or more sets of columns, wherein each set of columns define a dimension and include a base-level column that has a many-to-one or one-to-one relationship with each other column in the set of columns.

At step 525, the cube schema inference component can identify, from the set of columns for each dimension, one or more top-level columns, wherein each top-level column has only a one-to-many or one-to-one with each other column in the set of columns.

At step 527, the cube schema inference component can select, from the one or more identified top-level columns, a column that can be used to build a highest hierarchy for each dimension.

At step 529, the cube schema inference component can identify one or more intermediate level columns for each dimension hierarchy, wherein each intermediate level column has a many-to-one relationship with the selected top-level column, and a one-to-many relationship with the base-level column.

At step 531, the cube schema inference component can create a dimension hierarchy for each dimension using the identified base-level column, the selected top-level column, and the identified intermediate level columns.

At step 533, the cube schema inference component can determine, from each of the one or more sets of columns, one or more columns that have not been included in the corresponding dimension hierarchy, and mark the one or more determined columns as attribute columns of the base-level column in the corresponding dimension hierarchy. The one or more columns marked as attributes of the base-level column can include any column has a one-to-one relationship with the base-level column or the selected top-level column, and any unselected top-level column identified above.

At step 535, the cube schema inference component can create a cube schema using the one or more measures columns, the one or more flat dimension columns, the one or more dimension hierarchies, and the one or more attribute columns of the base-level column in each of the one or more dimension hierarchies.

Figure 6:
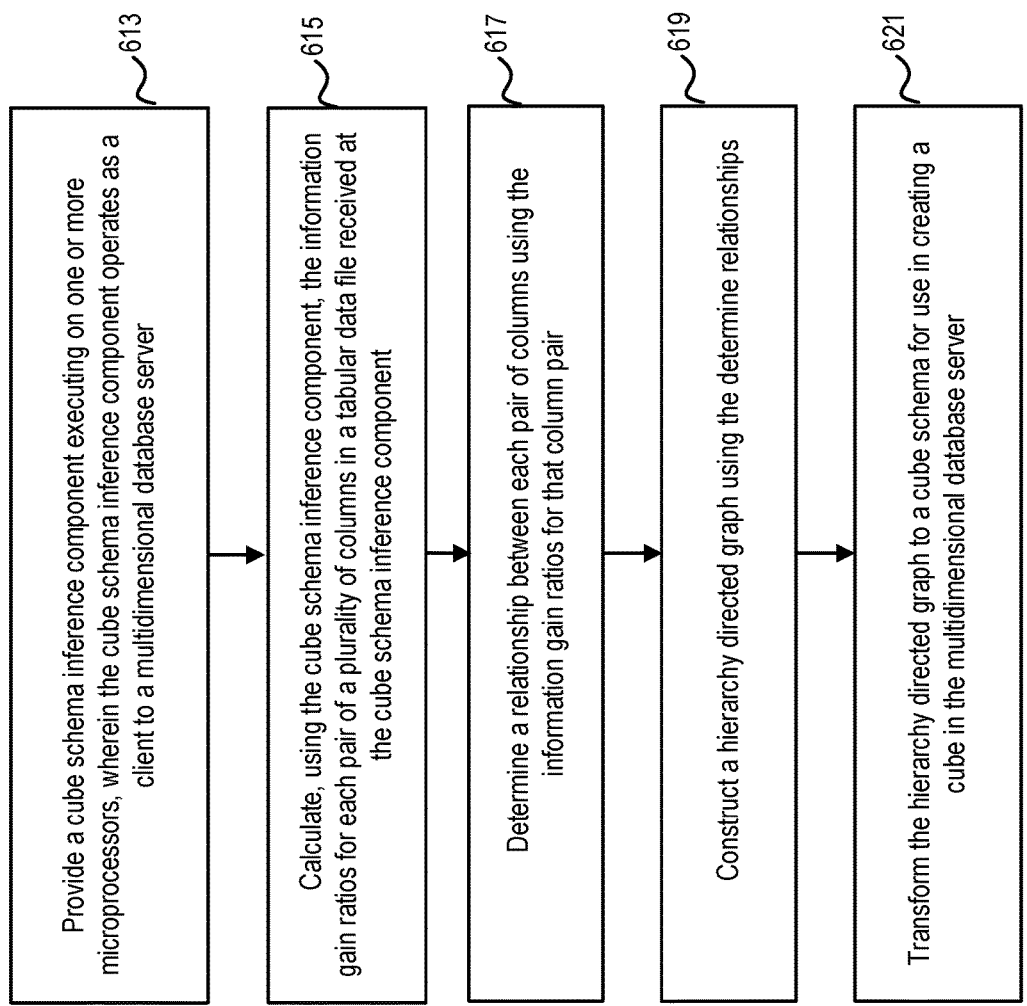
FIG. 6 illustrates a method for automatic inference of a cube schema from a tabular data for use in a multidimensional database environment, in accordance with an embodiment.

FIG. 6 illustrates a method for automatic inference of a cube schema from a tabular data for use in a multidimensional database environment, in accordance with an embodiment.

As shown in FIG. 6, at step 613, a cube schema inference component executing on one or more microprocessors is provided, wherein the cube schema inference component operates as a client to a multidimensional database server.

At step 615, the cube schema inference component is used to calculate information gain ratios for each pair of a plurality of columns in a tabular data received at the cube schema inference component.

At step 617, a relationship between each pair of columns is determined using the information gain ratios for that column pair.

At step 619, a hierarchy directed graph is constructed using the determined relationships.

At step 621, the hierarchy directed graph is transformed into a cube schema for use in creating a cube in the multidimensional database server.

Figure 7:
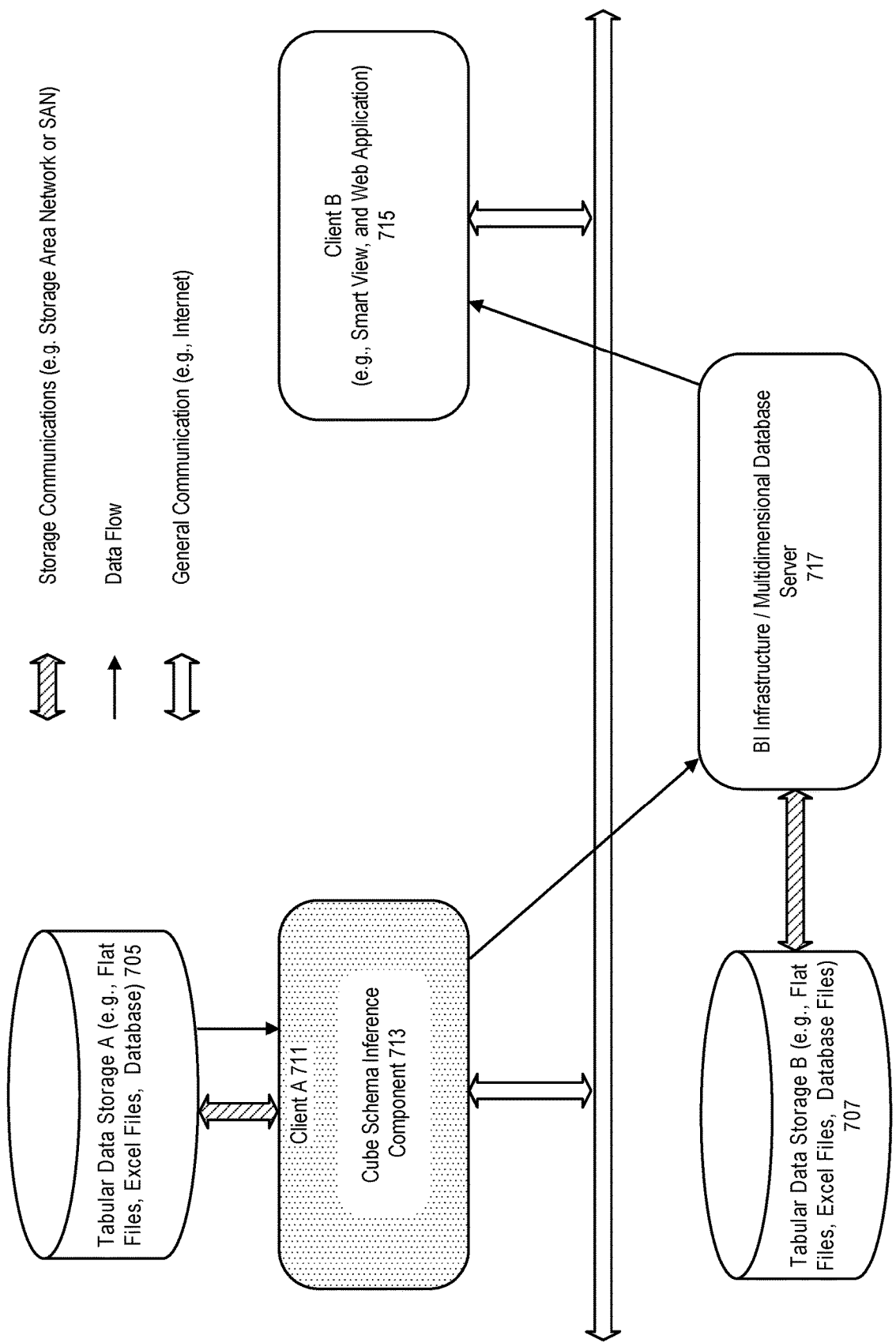
FIG. 7 illustrates an architectural diagram for an environment in which the system can be used, in accordance with an embodiment.

FIG. 7 illustrates an architectural diagram for an environment in which the system can be used, in accordance with an embodiment.

As shown in FIG. 7, a cube schema inference component 713 can run on a client A 711 to a multidimensional database server 717, extract a cube schema from a tabular data stored in tabular data storage A 705, and load the tabular data into a cube created using the cube schema in the multidimensional database server, for access by client B 715.

In accordance with an embodiment, the multidimensional database server can also communicate with a tabular data storage B 707, which can provide tabular data and database files to support the multidimensional database server.

For example, the tabular data and database files can include log files and metadata for Essbase studio.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for automatic inference of a cube schema from a tabular data for use in a multidimensional database environment, comprising:
a computer that includes one or more microprocessors;
a multidimensional database server executing on the computer;
a cube schema inference component operating as a client to the multidimensional database server, wherein the cube schema inference component is configured to
calculate information gain ratios for each pair of a plurality of columns in a tabular data received at the cube schema inference component,
determine a relationship between each pair of columns using the information gain ratios for that column pair,
construct a hierarchy directed graph using the determined relationships, and
transform the hierarchy directed graph into a cube schema for use in creating a cube in the multidimensional database server, wherein based on the hierarchy directed graph, each column of the plurality of columns in the tabular data is mapped to a cube element of the cube schema, wherein, based on the hierarchy directed graph:
one or more columns of the plurality of columns containing floating point numbers and no relationships with other columns are mapped to measures of the cube;
one or more columns of the plurality of columns having no relationships, one-to-many relationships, or many-to-one relationships with other columns are mapped to flat hierarchy dimensions of the cube; and
after mapping measures and flat hierarchy dimensions, one or more remaining columns of the plurality of columns are grouped into a set of columns that is mapped to a dimension hierarchy for a dimension of the cube.

2. The system of claim 1, wherein the cube schema inference component is further configured to construct a matrix to store the information gain ratios for each pair of columns.

3. The system of claim 1, wherein each edge of the hierarchy directed graph is labeled with information gain ratios between two adjacent nodes, and each node of the hierarchy directed graph is labeled with an entropy of a column represented by that node.

4. The system of claim 1, wherein the hierarchy directed graph is parsed and transformed into an XML-based cube schema by a hierarchy directed graph parser.

5. The system of claim 4, wherein the XML-based cube schema is a database outline in the multidimensional database server.

6. The system of claim 1, wherein each information gain ratio between a first column and a second column in a column pair measures an amount of information that the first column contains about the second column.

7. The system of claim 1, wherein the cube schema inference component calculates the information gain ratios for each pair of columns without interpreting values in each column.

8. The system of claim 1, wherein the tabular data is a data stored in an Excel sheet, a text file or a database table.

9. The system of claim 1, wherein the cube schema inference component is configured to parse the hierarchy directed graph and to perform a heuristic process to identify a plurality of cube elements for use in constructing the cube schema, the heuristic process comprising:
identifying, from a plurality of columns represented on the directed hierarchy graph, one or more measure columns and one or more flat hierarchy dimension columns,
removing the one or more measure columns and the one or more flat hierarchy dimension columns from the plurality of columns,
identifying one or more dimension hierarchies from the remaining columns, and
creating a cube schema using the one or more measure columns, the one or more flat hierarchy dimension columns, and the one or more dimension hierarchies.

10. A method for automatic inference of a cube schema from tabular data for use in a multidimensional database environment, comprising:
providing a cube schema inference component executing on one or more microprocessors, wherein the cube schema inference component operates as a client to a multidimensional database server in the multidimensional database environment;
calculating, using the cube schema inference component, information gain ratios for each pair of a plurality of columns in a tabular data received at the cube schema inference component;
determining a relationship between each pair of columns using the information gain ratios for that column pair;
constructing a hierarchy directed graph using the determined relationships; and
transforming the hierarchy directed graph into a cube schema for use in creating a cube in the multidimensional database server, wherein based on the hierarchy directed graph, each column of the plurality of columns in the tabular data is mapped to a cube element of the cube schema, wherein, based on the hierarchy directed graph:
one or more columns of the plurality of columns containing floating point numbers and no relationships with other columns are mapped to measures of the cube;
one or more columns of the plurality of columns having no relationships, one-to-many relationships, or many-to-one relationships with other columns are mapped to flat hierarchy dimensions of the cube; and
after mapping measures and flat hierarchy dimensions, one or more remaining columns of the plurality of columns are grouped into a set of columns that is mapped to a dimension hierarchy for a dimension of the cube.

11. The method of claim 10, wherein the cube schema inference component is further configured to construct a matrix to store the information gain ratios for each pair of columns.

12. The method of claim 10, wherein each edge of the hierarchy directed graph is labeled with information gain ratios between two adjacent nodes, and each node of the hierarchy directed graph is labeled with an entropy of a column represented by that node.

13. The method of claim 10, wherein the hierarchy directed graph is parsed and transformed into an XML-based cube schema by a hierarchy directed graph parser.

14. The method of claim 13, wherein the XML-based cube schema is a database outline in the multidimensional database server.

15. The method of claim 10, wherein each information gain ratio between a first column and a second column in a column pair measures an amount of information that the first column contains about the second column.

16. The method of claim 10, wherein the cube schema inference component calculates the information gain ratios for each pair of columns without interpreting values in each column.

17. The method of claim 10, wherein the tabular data is a data stored in an Excel sheet, a text file or a database table.

18. The method of claim 10, wherein the cube schema inference component is configured to parse the hierarchy directed graph and to perform a heuristic process to identify a plurality of cube elements for use in constructing the cube schema, the heuristic process comprising:
   identifying, from a plurality of columns represented on the directed hierarchy graph, one or more measure columns and one or more flat hierarchy dimension columns,
   removing the one or more measure columns and the one or more flat hierarchy dimension columns from the plurality of columns,
   identifying one or more dimension hierarchies from the remaining columns, and
   creating a cube schema using the one or more measure columns, the one or more flat hierarchy dimension columns, and the one or more dimension hierarchies.

19. A non-transitory computer readable storage medium, including instructions stored thereon which when read and executed by one or more computers cause the one or more computers to perform the steps comprising:
   providing a cube schema inference component executing on one or more microprocessors, wherein the cube schema inference component operates as a client to a multidimensional database server in a multidimensional database environment;
   calculating, using the cube schema inference component, information gain ratios for each pair of a plurality of columns in a tabular data received at the cube schema inference component;
   determining a relationship between each pair of columns using the information gain ratios for that column pair;
   constructing a hierarchy directed graph using the determined relationships; and
   transforming the hierarchy directed graph into a cube schema for use in creating a cube in the multidimensional database server, wherein based on the hierarchy directed graph, each column of the plurality of columns in the tabular data is mapped to a cube element of the cube schema, wherein, based on the hierarchy directed graph:
   one or more columns of the plurality of columns containing floating point numbers and no relationships with other columns are mapped to measures of the cube;
   one or more columns of the plurality of columns having no relationships, one-to-many relationships, or many-to-one relationships with other columns are mapped to flat hierarchy dimensions of the cube; and
   after mapping measures and flat hierarchy dimensions, one or more remaining columns of the plurality of columns are grouped into a set of columns that is mapped to a dimension hierarchy for a dimension of the cube.

20. The non-transitory computer readable storage medium of claim 19, wherein the tabular data is a data stored in an Excel sheet, a text file or a database table.

* * * * *